United States Patent [19]

Miyamae

[11] 4,075,629
[45] Feb. 21, 1978

[54] WARNING DEVICE

[76] Inventor: Toshiaki Miyamae, 9-15, Nishi-1 chome, Nakagawa, Ikuno, Osaka, Japan

[21] Appl. No.: 753,906

[22] Filed: Dec. 23, 1976

[51] Int. Cl.² .................................................. G08B 21/00
[52] U.S. Cl. .......................................... 340/421; 43/21; 242/84.1 A; 340/248 C; 340/253 A
[58] Field of Search ............................ 43/21, 26.1, 17; 242/84.1 A, 84.1 K; 340/421, 279, 253 A, 248 C, 248 A

[56] References Cited

U.S. PATENT DOCUMENTS

| 3,341,748 | 9/1967 | Kammiller | 340/248 C |
| 3,348,788 | 10/1967 | Vinokur | 43/21 |

Primary Examiner—Glen R. Swann, III
Attorney, Agent, or Firm—Moonray Kojima

[57] ABSTRACT

A Nichrome wire resistor is connected in series with the motor of a motorized fishing reel. A stabilized voltage is supplied (selected by a potentiometer) and a transistor switching circuit is arranged to actuate a signal if the voltage drop across the Nichrome resistor increases above the selected reference voltage (due to the voltage drop effect of the increased current through the motor if it is overloaded).

3 Claims, 2 Drawing Figures

WARNING DEVICE

The present invention relates generally to a warning device for making visible or audible signs, and more particularly to such a device adapted to a motorized fishing reel as to produce a signal to a fisherman whenever overload is caused through a fishing line to a motor of the reel he is angling with.

Generally, in case of fishing with a motorized fishing reel on a boat, every fisherman more often than not experiences that when he retrieves a line onto the reel in response to resistances of fish, he finds the line cut in its midway portion or the motor overheated.

In order to preclude such failure, some types of reels are on the market that are provided, for example, with a click gear brake system mounted on one side of a gear for transmitting a torque from a motor to a spool thereby to enable a fisherman to acoustically confirm the decreased rate of rotary speed of the spool.

SUMMARY OF THE INVENTION

However, the aforesaid click gear brake is operable only when a line is retrieved onto the spool, but does not work against any overload caused to the line being pendent deep into the sea.

BACKGROUND OF THE INVENTION

Accordingly, the present invention has been designed to eliminate or mitigate the above-mentioned drawbacks and disadvantages and has for one of its main objects the provision of a warning device that can provide a signal when a line being pendent in the sea or retrieved onto the spool is burdened with a load surpassing its pre-determined value.

Another object of the invention is to provide a warning device that can produce a buzzing sound as a warning sign thereby acoustically warning a fisherman against an overload acting on the line.

Another object of the invention is to provide a warning device that can emit a danger signal in the form of red light thereby visually warning him against the overload.

A further object of the invention is to provide a warning device that can normally keep on emitting a safety signal in the form of blue light thereby enabling him to visually confirm that his line is free of an overload.

A further object of the invention is to provide a warning device that can be housed in a fishing reel body as an independent unit without being combined with any mechanical component of the body and operated by electricity applied from an electric source to a motor.

These and other objects, features and advantages of the present invention will be apparent from the following detailed description of the invention when taken in conjunction with the accompanying drawing, in which:

DETAILED DESCRIPTION OF PREFERRED EMBODIMENTS

Figure 1:
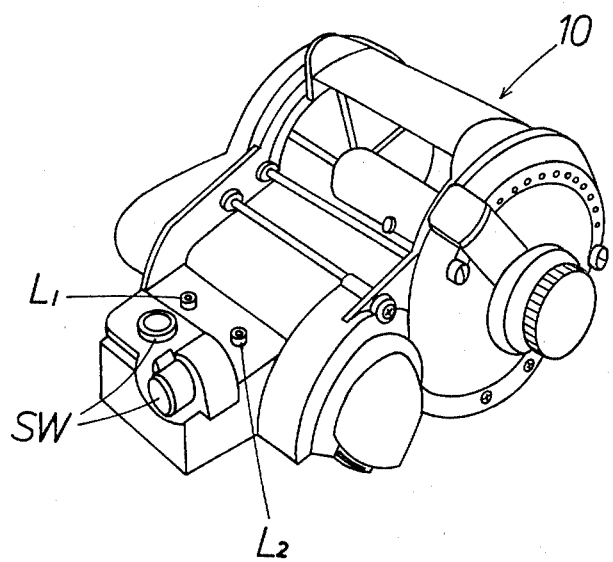
FIG. 1 is a perspective view showing as the whole a motorized fishing reel housed with a warning device of the invention.

Setting now forth in details a few preferred embodiments of the present invention, reference numeral 10 generally designates a fishing reel or a reel body. Said reel body 10 includes a red danger signal emitting light bulb L1 adapted to be lighted up when a D.C. motor M of the reel 10 is overloaded and a blue safety signal emitting light bulb L2 adapted to be kept alight in normalcy, being provided preferably with a normally open type push button switch means SW externally operable in response to any sign emitted from said bulbs L1 and L2. These bulbs are connected respectively to output terminals as shown by reference characters A and B of the accompanying drawing.

An electric circuit of the present invention to which said output terminals A and B are to be connected is a conventional type voltage stabilizing circuit composed, for example, of a carbon film resistor R4, a transistor TR1 and a voltage stabilizing diode D2, being adapted to normally emit a selected voltage from an emitter E of said transistor TR1 by the electricity of an input 12 volt storage battery BS.

To said D.C. motor M of the reel 10 there is connected a nicrome wire resistor R1 in series, voltage VE across said resistor R1 is selected to be below voltage VB across a variable resistor R3, the latter voltage VB being set to a desired value by potentiometer R3, so that normally a transistor TR2 is ground to almost a collector C'' thereof. Thus the output terminal A is not supplied with voltage and said red signal emitting light bulb L1 is not lighted up.

TR3 is a transistor adapted to be grounded only when supplied with voltage from the output terminal A of the transistor TR2 through a carbon film resistor R5 connected in series to the base of the circuit.

Said transistor TR3 via its collector C'' and emitter E'' provides a far greater resistance value than that of a resistor R6, and remains non-conductive in normalcy because it is not supplied with voltages from the transistor TR2, as has just been mentioned above.

However, due to the aforesaid great difference in resistance value, the output terminal B is supplied with voltages thereby lighting up the blue signal emitting light bulb L2 mounted between said terminal B and ground.

On the other hand, when the transistor TR2 which is normally grounded, as has also been mentioned above, has its collector C' and emitter E' provided with a smaller resistance value than that of said resistor R2 the output terminal B is not supplied with voltage, thus turning off the blue signal emitting light bulb L2.

Referring now to the case wherein the motor M is overloaded, the potential difference between the voltage VE across said resistor R1 and the voltage VB selected by potentiometer R3 is made smaller than the voltage across the resistor R2 so that the transistor TR2 is made turned off.

This has a result that the output terminal A is supplied with voltage to light up the red signal emitting light bulb L1, at the same time turning off the blue signal emitting light bulb L2.

In the preceding embodiment of the invention, description has been made of a warning device provided with the red danger signal emitting light bulb L1 connected to the output terminal A and the blue safety signal emitting light bulb L2 connected to the output terminal B in order to enable a fisherman to visually discern the rotational condition of the motor M.

Figure 2:
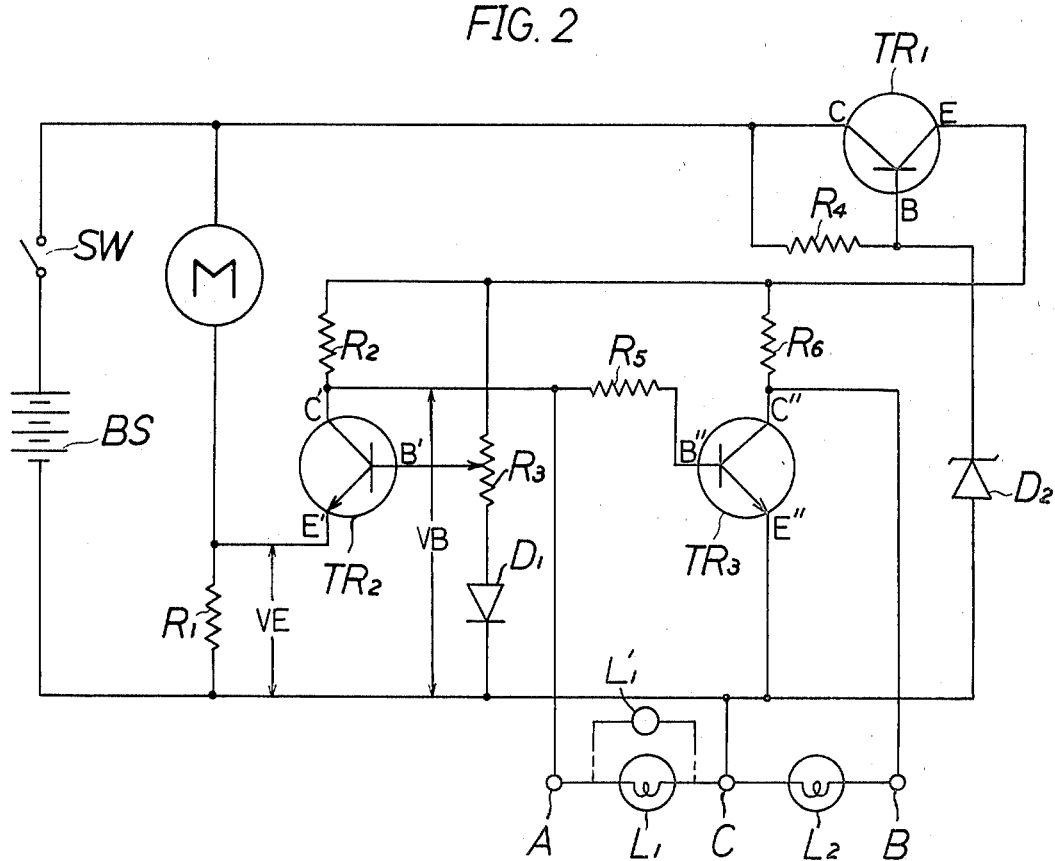
FIG. 2 is a diagram showing an electric circuit adapted to embody the warning device of the invention.

However, the bulb L1 may be replaceable with a buzzer $L_1'$ (shown symbolically in FIG. 2) or the like which acoustically enables him to discern said condition.

Accordingly, when the motor M is overloaded, the voltage VE across resistor R1 is raised by the voltage drop effect (V = 1R2) until the potential difference between said voltage VE and the voltage VB of the resistor R3 is made lower than the voltage across the resistor R2, thus turning off the transistor TR2.

This has a result that the output terminal A is supplied with voltage from the collector C' of the transistor TR2 to light up the red danger signal emitting light bulb L1 or actuate the aforesaid buzzer (not shown in the drawing) so that a fisherman is visually or acoustically able to discern the overloaded condition of the motor M and correct the same by manipulating the switch SW.

Though a few specific embodiments of the present invention have been shown and described herein, it will be apparent to those skilled in the art that the invention is not restricted to the details set forth but many changes and modifications may be made without departing from the spirit and scope of the invention as defined in the annexed claims.

What is claimed is:

1. An electronic warning device for a motorized fishing reel, comprising
   (a) an electric circuit means including a carbon film resistor, a first transistor and a voltage stabilizing diode;
   (b) a switch means mounted in a reel body in externally operable relation, being connectable to an independent electric source;
   (c) an emitter of said first transistor adapted to normally emit a pre-determined voltage irrespective of the voltage emitted by said source;
   (d) a D.C. motor controllably rotatable by operating said switch means;
   (e) a nicrome wire resistor connected to said motor in series;
   (f) a potentiometer adapted to select a voltage greater than the voltage across said nicrome wire resistor;
   (g) a second transistor disposed between said nicrome wire resistor and said potentiometer, being normally kept in conductive condition;
   (h) a first output terminal connected to said second transistor and adapted not to emit voltage when said transistor is kept conductive but to emit said voltage when said transistor is turned off;
   (i) a first signal emitting element connected to said first output terminal and adapted to be actuated by voltage supplied by said terminal;
   (j) a third transistor that normally remains non-conductive when not being supplied with said voltage from said second transistor but which is turned on when supplied with said voltage from said second transistor through said carbon file resistor;
   (k) a second output terminal connected to said third transistor and adapted to be normally supplied with said voltage; and
   (l) a second signal emitting element connected to said second output terminal and adapted to be actuated by said voltage from said second output terminal.

2. The warning device, as set forth in claim 1, wherein said first signal emitting element is a red signal emitting light bulb and said second signal emitting element is a blue signal emitting light bulb.

3. The warning device, as set forth in claim 1, wherein said first signal emitting element is a buzzer.

* * * * *